United States Patent [19]

Jennings

[11] Patent Number: 4,898,294

[45] Date of Patent: Feb. 6, 1990

[54] FROZEN FOOD CONTAINER FOR AIRCRAFT USAGE

[76] Inventor: Gary K. Jennings, 2428 Forest Brook La., Apt. 1104, Arlington, Tex. 76011

[21] Appl. No.: 238,397

[22] Filed: Aug. 31, 1988

[51] Int. Cl.$^4$ .............................................. A47J 41/00
[52] U.S. Cl. ...................................... 220/3.1; 220/23; 62/384; 62/457.9; 312/214; 312/236
[58] Field of Search ................... 62/384, 388, 457; 312/214, 236; 220/23, 23.83, 3.1

[56] References Cited

U.S. PATENT DOCUMENTS

| | | | |
|---|---|---|---|
| 3,906,744 | 9/1975 | Knapp et al. | 62/384 |
| 4,213,310 | 7/1980 | Buss | 220/23 |
| 4,397,159 | 8/1983 | Dodd | 62/388 |
| 4,399,667 | 8/1983 | Lamb | 62/382 |

*Primary Examiner*—A. Michael Chambers
*Attorney, Agent, or Firm*—Michael A. O'Neil

[57] ABSTRACT

A frozen food container adapted for use with wheeled carts of the type used to provide food and beverage service to aircraft passengers comprising bottom, end, side and top walls formed from a thermally insulating material contained between an inner and outer shell, the top wall having an insulated lid formed in the forward portion thereof, and opposed shoulders extending along the exterior of the side walls to support the container within a wheeled cart for transport through the aircraft aisle to facilitate service of frozen food items to aircraft passengers.

2 Claims, 2 Drawing Sheets

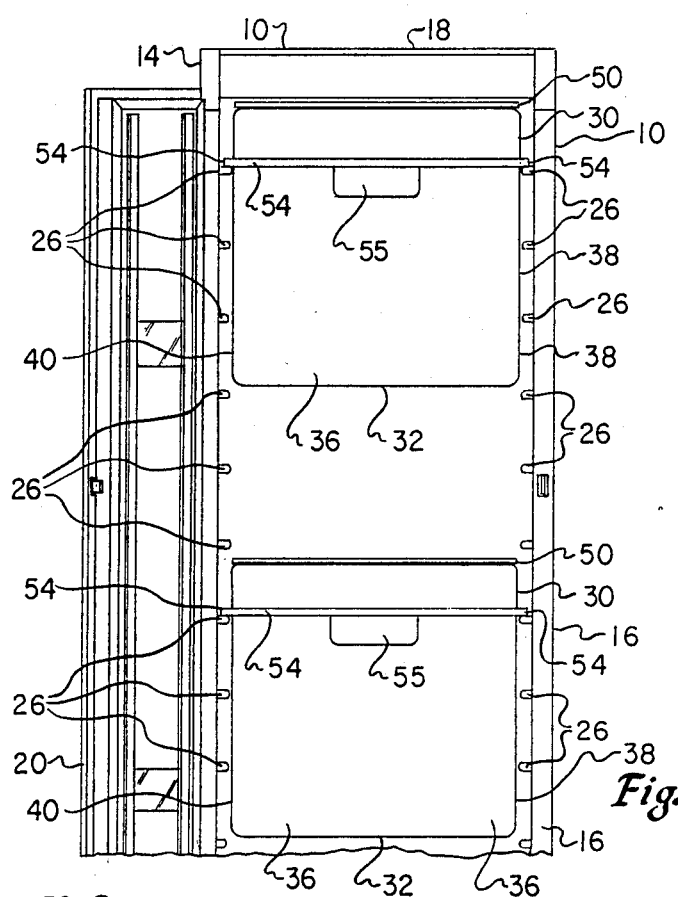
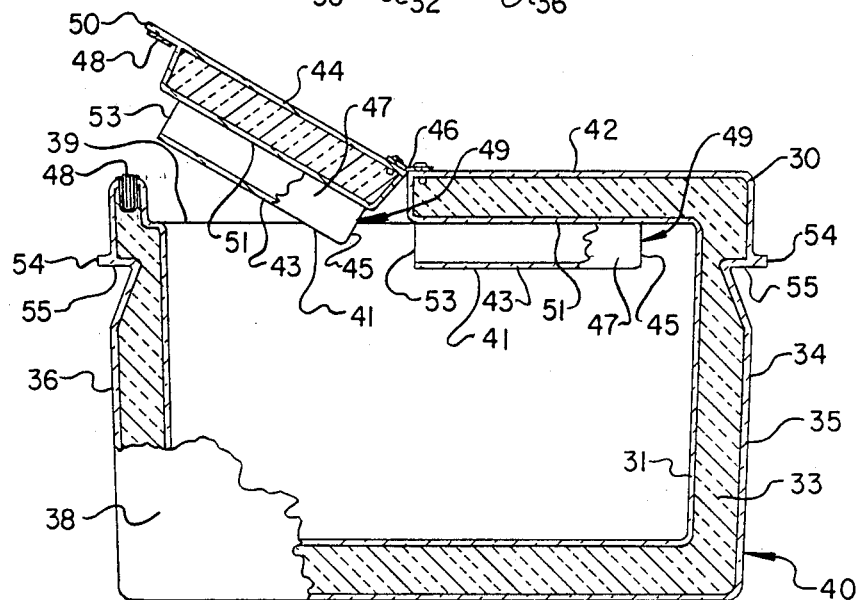

FROZEN FOOD CONTAINER FOR AIRCRAFT USAGE

TECHNICAL FIELD

This invention relates generally to frozen food containers, and more particularly to a container which facilitates the service of ice cream and similar frozen confections to passengers on commercial airliners.

BACKGROUND AND SUMMARY OF THE INVENTION

Food service on modern commercial airliners is facilitated by the use of wheeled non-refrigerated carts. Typically, a caterer arranges selected food items on trays, which are then loaded into the carts. The carts are delivered to the aircraft for stowage during takeoff. After takeoff, the carts are wheeled through the aisle of the aircraft, and the passengers are served from the carts by flight attendants. The wheeled carts are also utilized in beverage service. In the latter case, trays are used to store beverage cans, glassware, ice, etc. in the carts which, once again, are wheeled through the aircraft aisle to facilitate beverage service to the passengers.

Heretofore, it has not been feasible to serve ice cream and similar frozen confections to aircraft passengers. This is because there has not heretofore been provided a feasible means of maintaining ice cream in the frozen state during transport from the provider to the aircraft and during takeoff until passenger service. Typically, from the time the food and beverage trays are loaded onto a cart by a provider until the items are served to aircraft passengers, up to four hours pass, during which time ice cream would soften and melt.

The present invention overcomes the foregoing and other deficiencies long since associated with the prior art. In accordance with the broader aspects of the invention, there is provided an insulated container which is adapted for receipt and transport by the wheeled carts which are typically utilized in the service of food and beverages to aircraft passengers. The container is adapted to receive and store frozen food items during the takeoff phase of aircraft travel and prior to delivery to aircraft passengers.

More particularly, the present invention comprises a container with a thermally insulating material contained between an inner and outer shell, which is adapted to be received and transported by the wheeled carts utilized for commercial airline food service. The containers are provided with an insulated lid which allows access to the contents of the container when the container is partially withdrawn from the wheeled cart. Thus, the container facilitates passenger service while maintaining a reduced temperature atmosphere within the container. Preferably, each container is provided with one or more receptacles adapted to receive dry ice, which further insures the maintenance of the reduced temperature atmosphere within the container until the frozen food is served therefrom.

DESCRIPTION OF THE DRAWINGS

A more complete understanding of the invention may be had by reference to the following detailed description when taken in conjunction with the accompanying drawings, wherein:

FIG. 2 is a partial front view of the wheeled cart and the frozen food container of the present invention; and FIG. 3 is a longitudinal sectional view of the frozen food container of the present invention.

DETAILED DESCRIPTION

Figure 1:
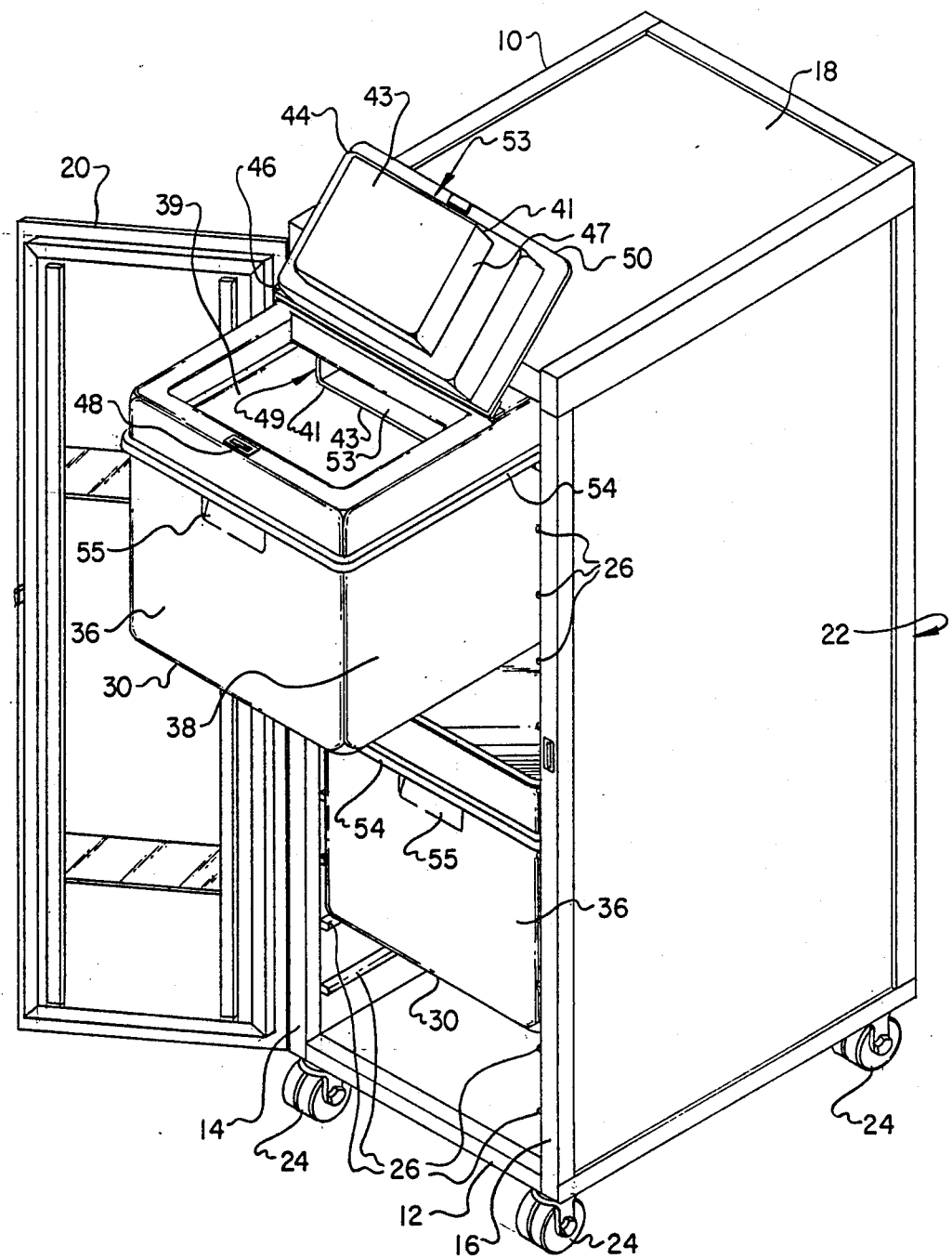
FIG. 1 is a perspective view of a wheeled cart of the type utilized in aircraft food service having frozen food containers of the present invention mounted therein.

Referring now to the drawings, and particularly to FIG. 1 thereof, there is shown a wheeled cart 10 of the type commonly utilized in the service of food and beverage items to passengers on board modern commercial aircraft. The wheeled cart 10 has a bottom wall 12, opposed side walls 14 and 16, and a top wall 18. The side walls 14 and 16 are supported by and extend upwardly from the bottom wall 12, and the top wall 18 is in turn supported by and extends between the side walls 14 and 16. The wheeled cart 10 is further provided with opposed doors 20 and 22 which provide access to the interior thereof from the opposite ends of the cart so that flight attendants can withdraw food items from the interior of the cart for passenger service from the opposite ends of the cart. The wheeled cart 10 is supported on wheels 24 for transport along the aisle of the aircraft. Suitable braking apparatus (not shown) is provided for arresting movement of the wheeled cart 10 at suitable locations in the aircraft aisle.

Referring particularly to FIG. 2, the side walls 14 and 16 of the wheeled cart 10 are provided with spaced sets of shoulders 26. In the typical utilization of the wheeled cart 10, the shoulders 26 are utilized to support food-bearing trays during takeoff of the aircraft. The food-bearing trays are subsequently withdrawn from the opposite ends of the cart by flight attendants for passenger service. The shoulders 26 also support open trays which receive glassware, beverage containers, ice, etc., to facilitate beverage service to aircraft passengers.

As is best shown in FIG. 3, the present invention comprises a frozen food container 30 having an inner shell 31, thermally insulating material 33 and an outer shell 35. The inner shell 31 and outer shell 35 form a bottom wall 32, opposed end walls 34 and 36, opposed side walls 38 and 40, and a top wall 42. The top wall 42 includes an insulated lid 44 which is pivotally supported by a hinge 46 and which is normally retained in the closed position illustrated in FIG. 3 by a magnetic latch 48. Opposed end walls 34 and 36 also form recessed handles 55, to facilitate ease of handling and transport of containers 30.

The insulated lid 44 may be opened as shown in FIGS. 1 and 3 to allow access to the contents of the container 30, through access port 39. A lip 50 extends outwardly beyond the magnetic latch 48 to provide a handle for opening the insulated lid 44 against the action of the magnetic latch 48. The insulated lid 44 is illustrated in its opened condition in FIG. 1.

The top wall 42 and the insulated lid 44 further comprise dry ice storage chambers 41. Each of said chambers comprises: a bottom wall 43; a back wall 45; opposing side walls 47 and 49; a top wall 51 formed by the inner shell 31; and an aperture 53 for receiving dry ice. When the insulated lid 44 is opened as illustrated in FIG. 1, dry ice may be easily placed in storage chambers 41, thereby further insuring the maintenance of a reduced temperature within container 30.

Referring now to FIG. 2, the container 30 is provided with opposed shoulders 54 extending along the opposite sides thereof. The shoulders 54 are rigidly secured to, or integrally formed with, the side walls 38 and 40 of the container 30 and are positioned to engage the shoulders 26 of the wheeled cart 10. As will be appreciated by reference to FIG. 2, the container 30 has a depth equal to approximately three times the depth of the open trays which are normally used in food and beverage service on commercial aircraft. As is shown in FIG. 1, the result is that only two containers 30 may be stored in each end of the wheeled cart 10. Nevertheless the capacity of the containers 30 is sufficient that two wheeled carts provided with a total of eight containers 30 may be utilized to service all of the coach passengers on a typical commercial aircraft.

Although preferred embodiments of the invention have been illustrated in the accompanying drawings and described in the foregoing detailed description, it will be understood that the invention is not limited to the embodiments disclosed, but is capable of numerous rearrangements, modifications, and substitutions of parts and elements without departing from the spirit of the invention.

I claim:

1. A frozen food container for use in conjunction with a wheeled cart of the type utilized in food service on a commercial aircraft and characterized by opposed side walls having opposed shoulders which support food and beverage trays and open containers within the interior of the cart, comprising:

thermal insulating material positioned between an interior and exterior shell forming a bottom wall, opposed end walls, opposed side walls and a top wall;

the top wall including an insulated lid pivotally supported on the top wall and including means for normally retaining the insulated lid in a closed condition; and opposed shoulders extending outwardly from the exterior of the side walls of the container and adapted to engage the shoulders of the wheeled cart to support the container therein, whereby the container is transported along the aisles of the aircraft and is adapted for withdrawal from the cart to facilitate opening of the insulated lid of the top wall to provide access to frozen food items within the container for service to aircraft passengers.

2. A frozen food container in accordance with claim 1 further comprising at least one internal dry ice storage compartment defined by opposed side walls descending from the top wall of the container, a bottom wall extending between the side walls and one end wall thereby forming a storage compartment open on one end wherein dry ice may be stored, thereby maintaining a low temperature atmosphere within the container.

* * * * *